United States Patent
Case

(10) Patent No.: US 7,457,002 B2
(45) Date of Patent: Nov. 25, 2008

(54) REVERSE DIFFUSION DIGITAL HALFTONE QUANTIZATION

(75) Inventor: Robert M. Case, Canyon Lake, TX (US)

(73) Assignee: Skyward Optics LLC, Las Vegas, NV (US)

( * ) Notice: Subject to any disclaimer, the term of this patent is extended or adjusted under 35 U.S.C. 154(b) by 145 days.

(21) Appl. No.: 11/513,848

(22) Filed: Aug. 31, 2006

(65) Prior Publication Data

US 2007/0013952 A1 Jan. 18, 2007

Related U.S. Application Data

(63) Continuation of application No. 10/345,601, filed on Jan. 16, 2003, now Pat. No. 7,193,753.

(51) Int. Cl.
*G06F 15/00* (2006.01)

(52) U.S. Cl. .............. 358/1.9; 358/3.03; 358/3.04; 358/3.05; 358/534; 358/3.08; 382/252; 382/275

(58) Field of Classification Search .......... 358/1.9, 358/534, 3.03, 3.04, 3.05, 3.06, 3.08, 3.26; 382/252, 275

See application file for complete search history.

(56) References Cited

U.S. PATENT DOCUMENTS

| | | | |
|---|---|---|---|
| 6,002,493 A | 12/1999 | Case | |
| 7,079,290 B2 | 7/2006 | Crossland et al. | |
| 7,265,875 B2 * | 9/2007 | Kress | 358/3.06 |
| 2003/0081256 A1 * | 5/2003 | Wang et al. | 358/3.06 |

OTHER PUBLICATIONS

Villarreal, "Quality and Compressibility of Checkerboard-Based Digital Halftoning Algorithms," Thesis, Master of Science in Computer Science, Southwest Texas State University, 2002, pp. 47-56.
Adler, et al, "The Mathematics of Halftoning," International Business Machines Journal of Research and Development, vol. 47, No. 1, 2003, pp. 5-15.
Floyd, et al.: "An Adaptive algorithm for Spatial Grayscale", Society for Information Display Symposium, Digest of Technical Papers, 1995, pp. 36-37.

* cited by examiner

*Primary Examiner*—Twyler L. Haskins
*Assistant Examiner*—Jacky X Zheng

(57) ABSTRACT

An improved digital halftoning method that uses an input image's global gray levels to determine the local gray levels of a monochrome output image. Input multi-bit pixels grouped into two-pixel-by-two-pixel local subcells are variously aggregated into one or more larger supercells. The size of said supercell(s) is related to and limited by the size of the global input bitmap. A final monochrome gray level is derived from said supercell(s) and distributed within contained subcells. Subcell gray levels are expressed as interim whole monochrome pixels and gray level remainders. A comparison is made of the final supercell and the summed interim subcell monochrome gray levels. An ordering of the remainders is used for assignment of additional monochrome pixels, if necessary, to yield final subcell monochrome gray levels. Gray level rounding errors thus are quantized by reverse diffusion until a monochrome gray level for each of the global image's two-pixel-by-two-pixel local subcells is derived.

25 Claims, 13 Drawing Sheets

| 150 | 158 | 121 | 89 | 44 | 28 | 44 | 93 |
| --- | --- | --- | --- | --- | --- | --- | --- |
| 255 | 255 | 255 | 239 | 182 | 93 | 52 | 20 |
| 255 | 255 | 255 | 239 | 195 | 125 | 65 | 40 |
| 255 | 255 | 255 | 255 | 255 | 186 | 89 | 44 |
| 235 | 231 | 239 | 227 | 203 | 178 | 89 | 44 |
| 170 | 174 | 174 | 170 | 150 | 113 | 65 | 36 |
| 117 | 121 | 121 | 121 | 113 | 85 | 52 | 36 |
| 81 | 81 | 60 | 69 | 73 | 93 | 77 | 69 |

*Fig 2A*

| 818 | 704 | 347 | 209 |
| --- | --- | --- | --- |
| 1020 | 1004 | 761 | 238 |
| 810 | 810 | 644 | 234 |
| 400 | 371 | 364 | 234 |

*Fig 2B*

| I=3W R=53 F=3W | I=2W R=194 F=3W | I=1W R=92 F=1W | I=0W R=209 F=1W |
|---|---|---|---|
| I=4W R=0 F=4W | I=3W R=239 F=4W | I=2W R=251 F=3W | I=0W R=238 F=1W |
| I=3W R=45 F=3W | I=3W R=45 F=3W | I=2W R=134 F=3W | I=0W R=234 F=1W |
| I=1W R=145 F=2W | I=1W R=116 F=1W | I=1W R=109 F=1W | I=0W R=234 F=1W |

| 255 | 255 | 255 | 255 | 255 | 255 | 255 | 255 |
|---|---|---|---|---|---|---|---|
| 255 | 255 | 255 | 255 | 255 | 255 | 255 | 254 |
| 255 | 255 | 255 | 255 | 255 | 252 | 235 | 210 |
| 255 | 255 | 255 | 248 | 254 | 230 | 184 | 143 |
| 255 | 241 | 208 | 176 | 154 | 109 | 54 | 28 |
| 224 | 193 | 146 | 105 | 86 | 57 | 43 | 33 |
| 196 | 180 | 128 | 60 | 57 | 38 | 27 | 18 |
| 166 | 214 | 180 | 126 | 69 | 34 | 23 | 26 |

*Fig 3A*

| 1020 | 1020 | 1020 | 1019 |
|---|---|---|---|
| 1020 | 1013 | 991 | 772 |
| 913 | 635 | 406 | 158 |
| 756 | 495 | 198 | 94 |

*Fig 3B*

| I=4W<br>R=0<br>F=4W | I=4W<br>R=0<br>F=4W | I=4W<br>R=0<br>F=4W | I=3W<br>R=254<br>F=4W |
|---|---|---|---|
| I=4W<br>R=0<br>F=4W | I=3W<br>R=248<br>F=4W | I=3W<br>R=226<br>F=4W | I=3W<br>R=7<br>F=3W |
| I=3W<br>R=148<br>F=3W | I=2W<br>R=125<br>F=2W | I=1W<br>R=151<br>F=2W | I=0W<br>R=158<br>F=1W |
| I=2W<br>R=246<br>F=3W | I=1W<br>R=240<br>F=2W | I=0W<br>R=198<br>F=1W | I=0W<br>R=94<br>F=0W |

| 31 | 28 | 24 | 29 | 28 | 27 |
|----|----|----|----|----|----|
| 29 | 29 | 32 | 35 | 29 | 31 |
| 33 | 34 | 31 | 32 | 30 | 28 |
| 37 | 42 | 32 | 33 | 34 | 31 |
| 43 | 44 | 36 | 39 | 45 | 41 |
| 43 | 46 | 45 | 43 | 48 | 43 |
| 52 | 61 | 55 | 48 | 47 | 45 |
| 69 | 68 | 59 | 65 | 61 | 57 |
| 79 | 60 | 56 | 79 | 83 | 66 |
| 79 | 63 | 64 | 81 | 72 | 60 |
| 71 | 76 | 77 | 71 | 59 | 59 |
| 66 | 73 | 73 | 61 | 59 | 76 |

*Fig 4A*

| | | |
|---|---|---|
| 117 | 120 | 115 |
| 146 | 128 | 123 |
| 176 | 163 | 177 |
| 250 | 227 | 210 |
| 281 | 280 | 281 |
| 286 | 282 | 253 |

*Fig 4B*

| I=0W<br>R=117<br>F=0W | I=0W<br>R=120<br>F=0W | I=0W<br>R=115<br>F=0W |
|---|---|---|
| I=0W<br>R=146<br>F=1W | I=0W<br>R=128<br>F=0W | I=0W<br>R=123<br>F=1W |
| I=0W<br>R=176<br>F=1W | I=0W<br>R=163<br>F=1W | I=0W<br>R=177<br>F=1W |
| I=0W<br>R=250<br>F=1W | I=0W<br>R=227<br>F=1W | I=0W<br>R=210<br>F=1W |
| I=1W<br>R=26<br>F=1W | I=1W<br>R=25<br>F=1W | I=1W<br>R=26<br>F=1W |
| I=1W<br>R=31<br>F=1W | I=1W<br>R=27<br>F=1W | I=0W<br>R=253<br>F=1W |

REVERSE DIFFUSION DIGITAL HALFTONE QUANTIZATION

This application is a continuation of U.S. patent application Ser. No. 10/345,601, entitled "REVERSE DIFFUSION DIGITAL HALFTONE QUANITZATION", filed Jan. 16, 2003 now U.S. Pat. No. 7,193,753.

FEDERALLY SPONSORED RESEARCH

Not Applicable.

SEQUENCE LISTING OR PROGRAM

Not Applicable.

BACKGROUND

1. Field of Invention

My invention relates to digital halftoning, specifically to the distribution of monochrome pixels within a digital halftone cell.

2. Description of Prior Art

Digital halftoning seeks to render complex images using a monochrome bitmap. Within this graph paper-like grid, each square picture element or pixel is designated one of two "colors." Said colors are usually (but not limited to) black and white. Each pixel then may be represented by the binary numbers 0 or 1.

A reproduction of an input image appears when human vision fails to distinguish the monochrome pixels. This usually occurs when viewing from a distance. The eye "averages" a group of black and white pixels and interprets it as a level of gray.

The smallest square grouping at which this phenomenon occurs measures two-pixels-by-two-pixels. This four pixel area or cell may depict five levels of gray: 1.) all four pixels black; 2.) three black and one white; 3.) two black and two white; 4.) one black and three white; and 5.) all four white. These five gray levels may be nominally interpreted as 0%, 25%, 50%, 75%, and 100% white, occurring in increments of approximately 25%.

The four corresponding pixels of a 1:1 input bitmap most often are captured at a greater binary pixel-depth. At an arbitrary 8-bits per pixel, each pixel may display a gray level range of 0-255. The four-pixel-cell may display a gray level range of 0-1020. This translates into 1021 gray levels in increments of approximately 0.1%.

Comparing specific corresponding four-pixel-cell input and output gray levels, this reduction of 1020 levels to five levels will yield a difference or rounding error. A method developed by Robert W. Floyd, et al, published in "An Adaptive Algorithm for Spatial Grayscale," (Proceeding of the S.I.D. vol. 17/2 Second Quarter [1976] pp. 75-76) is to take this error and spread or "diffuse" it to adjoining input cells. Known as Floyd and Steinberg "error diffusion," the method has become the prevailing method used throughout the digital halftoning industry today.

A problem with error diffusion is that it works well when the errors to be diffused are relatively large. However, when the errors are relatively small, the method allows them to accumulate until they "drop" many cells away from where they first occurred. The result is an artifact, usually in a serpentine shape, that compromises the grayscale accuracy of the output image. Floyd, et al, does not teach how to use all of the input image's pixels to determine the "color" of individual output pixels.

In my previous U.S. patent, "Method for Reproducing an Image" (Case, U.S. Pat. No. 6,002,493 [1999]), I developed a method for pattern selection of monochrome pixels within a cell. In applying my pattern method, I encountered the same rounding error problem that error diffusion seeks to address. Without diffusion of the rounding errors, the size of the output cell dictates the global image's grayscale.

If a four-pixel-by-four-pixel input cell is used at a 1:1 ratio to derive a four-pixel-by-four pixel output cell, the global image will be restricted to just 17 gray levels. They include all black plus the incremental addition of 16 individual white pixels per cell. At a two-pixel-by-two-pixel cell, the global image will be restricted to just 5 gray levels. They include all black plus the incremental addition of 4 individual white pixels per cell. While Case does teach how to determine the "color" of pixels within a digital halftone cell, it does not teach how to use all of the input image's pixels to determine the output monochrome gray level of each cell.

In error diffusion, micro elements are used to determine macro elements. Local monochrome gray levels effectively determine the global monochrome gray levels. In such a scenario, the influences of various micro elements will clash, causing the macro elements to stray from the task of accurately reproducing the input bitmap.

Objects and Advantages

Several objects and advantages of the present invention are:

(a) to provide the most accurate global image grayscale reproduction of which a monochrome square pixel of specified size is capable.

(b) to provide the most accurate local image grayscale reproduction of which a two-pixel-by-two-pixel monochrome square cell is capable.

(c) to enable all of the pixels in the input global image to optimally affect the grayscale of each local two-pixel-by-two-pixel digital halftone cell.

(d) to accomplish the above efficiently by means of a digital computer.

SUMMARY

According to the present invention, a digital halftone is produced that accurately and efficiently reproduces both the global and local analog gray levels of the input image.

DRAWINGS

Drawing Figures

FIG. 2A shows a square portion of the input bitmap, a supercell, designating the gray level of each contained pixel.

FIG. 2B shows the same supercell, designating the gray level of each contained two-pixel-by-two-pixel subcell.

FIG. 3A shows a second square portion of an input bitmap, a supercell, designating the gray level of each contained pixel.

FIG. 3B shows the same supercell, designating the gray level of each contained two-pixel-by-two-pixel subcell.

FIG. 4A shows a rectangular portion of an input bitmap, a supercell, designating the gray level of each contained pixel.

FIG. 4B shows the same supercell, designating the gray level of each contained two-pixel-by-two-pixel subcell.

Reference Designations in Drawings

I interim whole monochrome pixels
R gray level remainder
F final derived gray level in whole monochrome pixels
W white monochrome pixel

DETAILED DESCRIPTION

Figure 1:
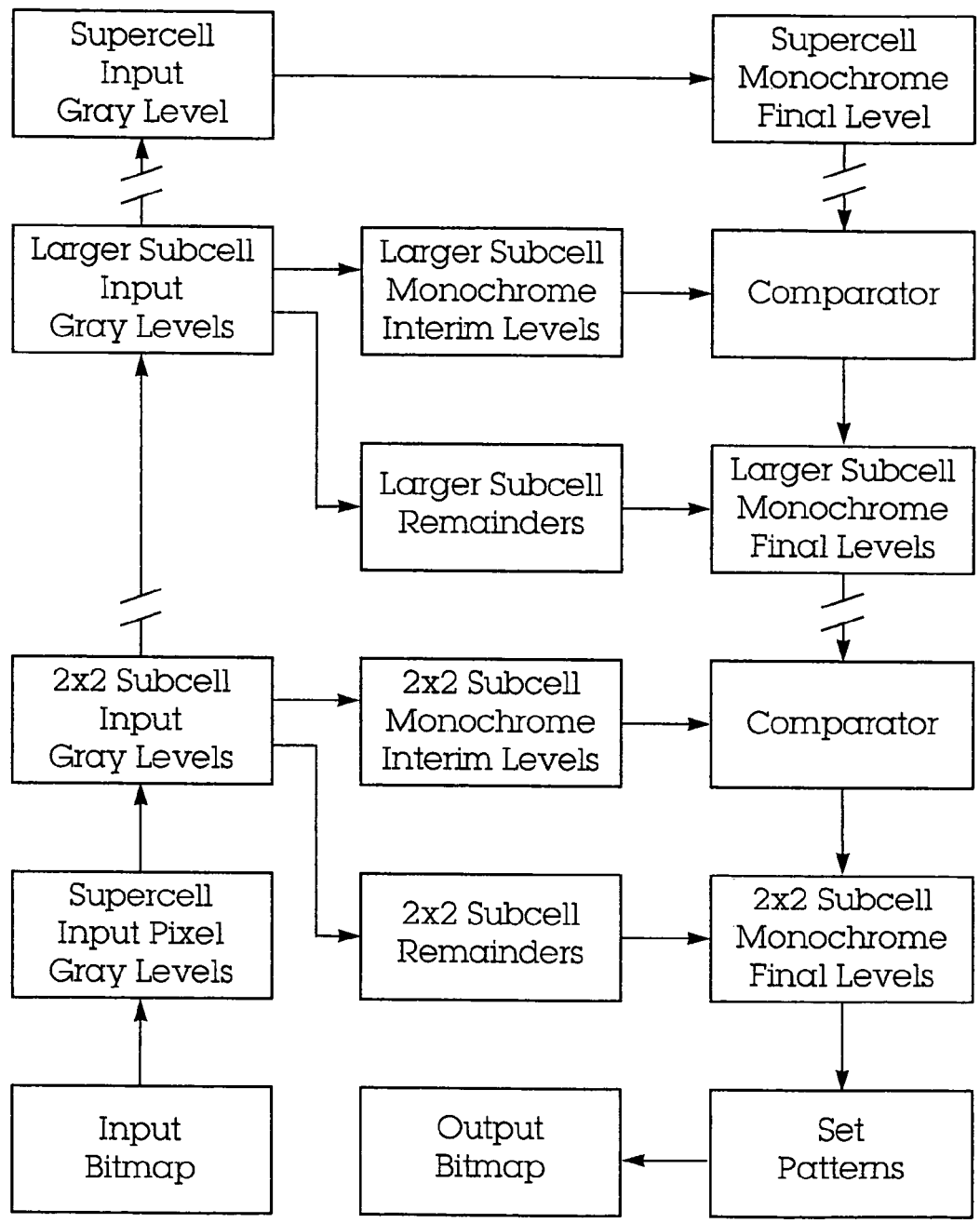
FIG. 1 shows a flow chart of the method of the invention as performed by a binary computing device.

Description—FIG. 1—Flow Chart

An Input Bitmap contains all of an input image's pixels captured at a multi-bit pixel depth. Supercell Input Pixel Gray Levels are derived by subdividing the input bitmap into a number of equal-sized supercells. 2×2 Subcell Input Gray Levels are derived by subdividing each said supercell into two-pixel-by-two-pixel subcells. From said subcells 2×2 Subcell Monochrome Interim Levels and 2×2 Subcell Remainders are derived and are stored separately for later retrieval.

Larger Subcell Input Gray Levels may be derived by grouping contained subcells into a number of equal-sized larger subcells. From said larger subcells are derived Larger Subcell Monochrome Interim Levels and Larger Subcell Remainders, which also are stored separately for later retrieval. Alternatively, this step may be applied several times or omitted, as indicated by the line interruptions. A Supercell Input Gray Level is derived when the grouping of all contained subcells is equal in size to said supercell.

A Supercell Monochrome Final Level is derived from said supercell. For the next subcell level, a Comparator acts on the Supercell Monochrome Final Level and the retrieved Larger Subcell Monochrome Interim Levels. The retrieved Larger Subcell Remainders are then utilized to derive the Larger Subcell Monochrome Final Levels. This operation continues until all of the 2×2 Subcell Monochrome Final Levels are derived.

Set Patterns places the derived final levels into specific patterns within the two-pixel-by-two-pixel monochrome cells. The pattern-setting method to be used is not restricted by the present invention. However, here the teaching of U.S. Pat. No. 6,002,493 by Case, "Method for Reproducing an Image," (1999) is selected. Following the setting of the patterns, the monochrome subcells are recombined into a monochrome Output Bitmap.

FIGS. 2A-2H—Preferred Embodiment

FIG. 2A shows a square portion of the global image designated as a supercell.

Each of the 64 pixels contained within is designated an input 8-bit gray level.

FIG. 2B shows the grouping of individual pixels into square two-pixel-by-two-pixel subcells. Each of the 16 subcells is designated a summed input gray level.

Figures 2C, 2D:
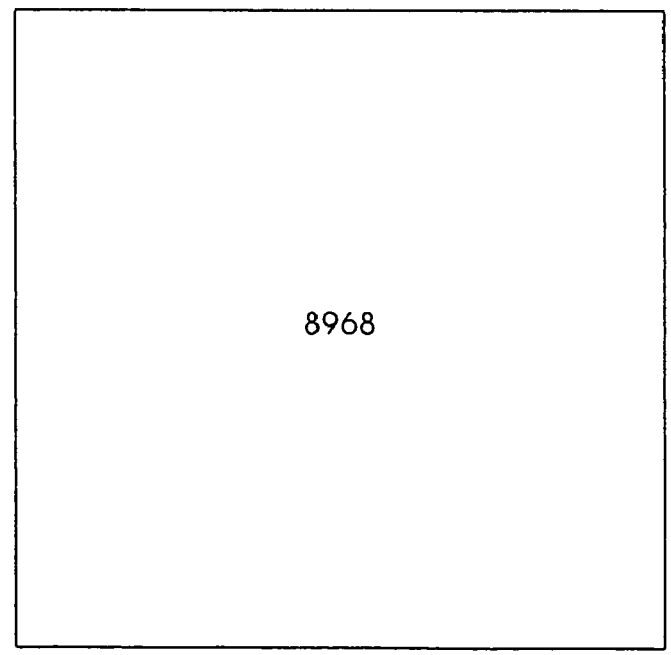
FIG. 2C shows the supercell, designating the gray level of each of a number of contained larger subcells.
FIG. 2D shows the supercell, designating its overall gray level.

FIG. 2C shows the grouping of subcells into larger square four-pixel-by-four-pixel subcells. Each of the four larger subcells is designated a summed input gray level.

FIG. 2D shows the grouping of larger subcells into the original supercell. The supercell is designated a summed input gray level.

Figures 2E, 2F:
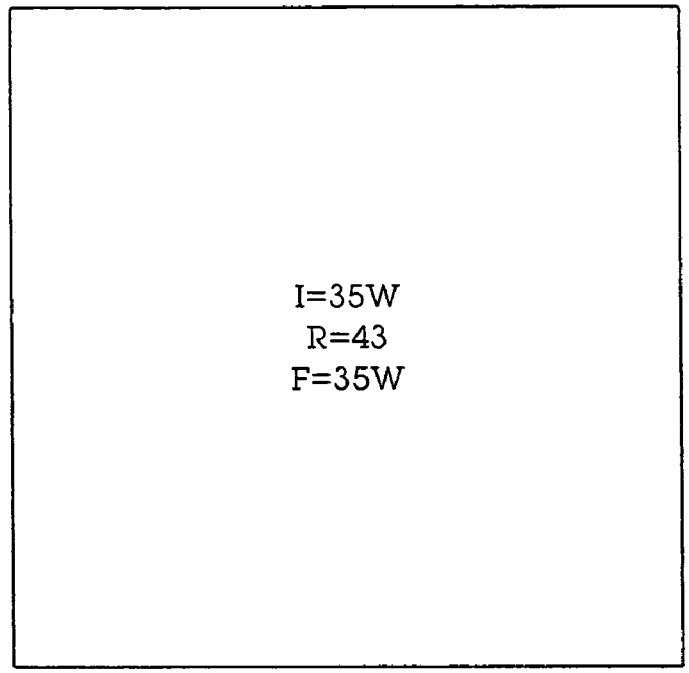
FIG. 2E shows the supercell, designating a final monochrome gray level.
FIG. 2F shows the supercell, designating final monochrome gray levels for each of the contained larger subcells.

FIG. 2E shows the derivation of the supercell monochrome final level. The super-cell is designated: I a monochrome interim level expressed in white pixels, plus R a gray level remainder, and F a monochrome final level expressed in white pixels.

FIG. 2F shows the derivation of the larger subcell monochrome final levels for the 4 four-pixel-by-four-pixel subcells within the supercell. Each subcell has been designated: I a monochrome interim level expressed in white pixels, plus R a gray level remainder, and F a monochrome final level expressed in white pixels.

Figures 2G, 2H:
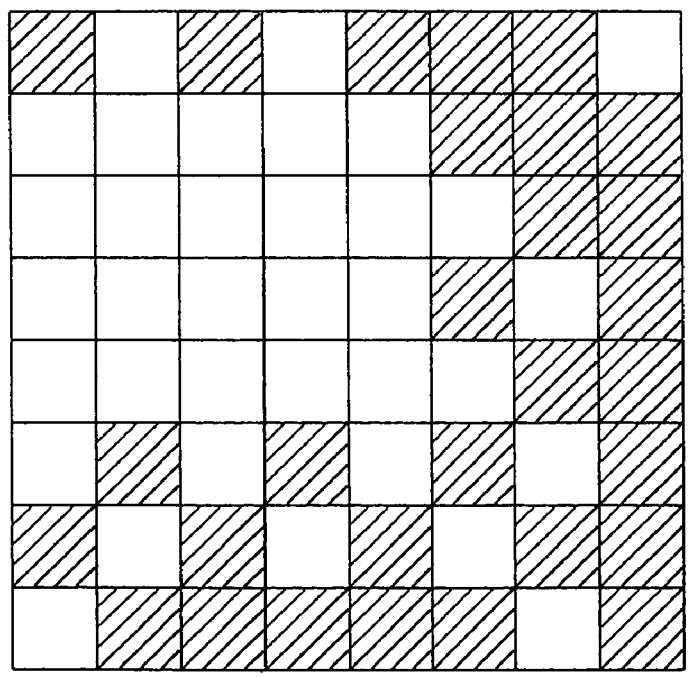
FIG. 2G shows the supercell, designating final monochrome gray levels for each of the contained two-pixel-by-two-pixel subcells.
FIG. 2H shows the supercell with the setting of monochrome two-pixel-by-two-pixel subcell patterns.

FIG. 2G shows the derivation of the subcell monochrome final levels for the 16 two-pixel-by-two-pixel subcells. Again each subcell has been designated: I a monochrome interim level expressed in white pixels, plus R a gray level remainder, and F a monochrome final level expressed in white pixels.

FIG. 2H shows the setting of monochrome patterns for each two-by-two subcell according to U.S. Pat. No. 6,002,493 by Case, "Method for Reproducing an Image," 1999.

FIGS. 3A-3F-Additional Embodiment

An additional embodiment is shown in FIGS. 3A-3F; in this case all of the two-pixel-by-two-pixel subcells immediately are grouped into a supercell. No interim larger subcells are used. This additional embodiment shows how a supercell of any size may be directly linked to the two-pixel-by-two-pixel local subcells.

FIGS. 4A-4J—Alternative Embodiment

Figures 4C, 4D:
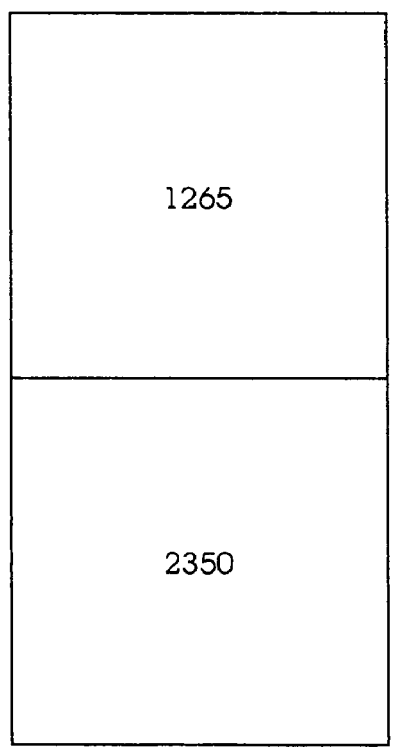
FIG. 4C and FIG. 4D show the supercell, designating the gray level of each of a number of contained larger subcells.
Figure 4E:
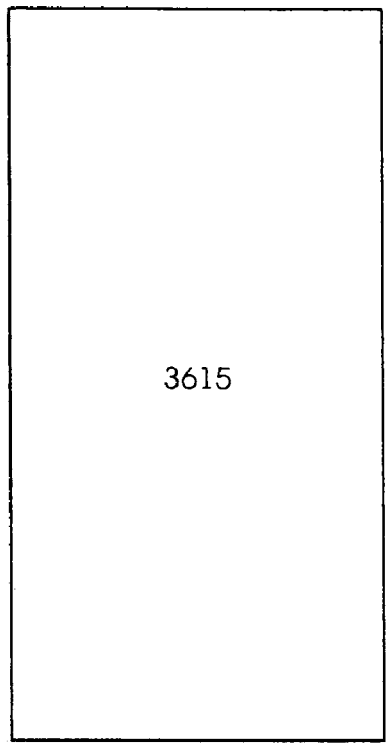
FIG. 4E shows the supercell, designating its overall gray level.

An alternative embodiment is shown in FIGS. 4A-4J; in this case the supercell is not square but rectangular. Two levels of interim larger subcells are shown: FIG. 4C shows the 18 two-pixel-by-two-pixel subcells grouped into 6 two-pixel-by-six-pixel larger subcells and FIG. 4D shows those larger subcells grouped into 2 six-pixel-by-six-pixel larger subcells.

This alternative embodiment shows how a rectangular supercell of any size may use a number of interim larger subcells to finally derive the two-pixel-by-two-pixel local subcells. Note that at each interim level, the larger subcells are of equal dimensions.

ADVANTAGES

From the description above, a number of advantages of my reverse diffusion digital halftoning become evident:

(a) The analog gray level of both the global input image and the local two-pixel-by-two-pixel input cells is reproduced more accurately by a monochrome bitmap.

(b) The method of separating local monochrome partial pixel remainders and using them to determine local whole monochrome pixel gray levels is tailored to efficient execution by a digital computer.

(c) This combination of accuracy and efficiency yields better monochrome grayscale reproduction of analog images in less time.

OPERATION

The subject of the operation of the current invention is an image expressed as an Input Bitmap (FIG. 1). This bitmap has been captured by a scanner, a digital camera or similar device. It is of a specified width and height expressed in pixels. Each dimension is divisible by two to contain two-pixel-by-two-pixel subcells evenly. Each pixel has a specified analog gray level expressed as a binary number. The size of the binary number determines the number of gray levels possible within each pixel.

This input bitmap may be subdivided into a number of supercells of equal size. These supercells are of a specified width and height. (Note that the entire input bitmap may be considered the supercell.) The supercell in FIG. 2A is eight pixels wide by eight pixels high, containing 64 pixels. The discrete gray level of each of the 64 pixels is designated as Supercell Input Pixel Gray Levels (FIG. 1). In FIG. 2A, each pixel has been captured with an 8-bit binary number and thus exhibits a gray level range of 0-255 (0=black, 255=white).

Operation—Two-Pixel-By-Two-Pixel Subcells

The input supercell then is subdivided into two-pixel-by-two-pixel subcells. The gray level of each subcell's four contained pixels is summed. This sum is the gray level of the subcell, designated 2×2 Subcell Input Gray Levels (FIG. 1). In FIG. 2B, the gray level sums are shown for each of the supercell's contained 16 subcells. The gray level range of each of the four-pixel subcells is 0-1020 (0=black, 1020=white).

Each of the 16 subcell gray level sums then is divided by one whole monochrome output white pixel. At 8-bits per pixel, this divisor is 255. Each of the results is specified in interim whole monochrome white pixels and a gray scale remainder of less than 255. The whole pixel integers, designated 2×2 Subcell Monochrome Interim Levels (FIG. 1) are stored for later retrieval. The gray scale remainders, designated 2×2 Subcell Remainders (FIG. 1), also are stored for later retrieval.

The gray levels of all of the subcells now may be summed and designated the Supercell Input Gray Level (FIG. 1). (The option of doing this is designated by the broken lines in FIG. 1). However, the preferred embodiment of the invention is to group the two-pixel-by-two-pixel subcells into one or more levels of larger subcells of equal dimensions so that each contains the same number of antecedent subcells. In FIG. 2C, the larger subcells are made up of four two-pixel-by-two-pixel subcells and are 4 pixels wide and 4 pixels high. The gray level sums of each of the larger subcell's four contained two-pixel-by-two-pixel subcells now are summed and designated Larger Subcell Input Gray Levels (FIG. 1). The gray level range of each larger subcell is 0-4080 (0=black, 4080=white).

Each of the supercell's four larger subcell gray level sums then is divided by one whole monochrome output white pixel, 255. Each of the results is specified in interim whole monochrome white pixels and a gray scale remainder of less than 255. The whole pixel integers, designated Larger Subcell Monochrome Interim Levels (FIG. 1) are stored for later retrieval. The gray scale remainders, designated Larger Subcell Remainders (FIG. 1), also are stored for later retrieval.

Now the supercell's four larger subcells' gray levels are summed and designated the Supercell Input Gray Level (FIG. 1). The supercell's gray level range is 0-16,320 (0=black, 16,320=white). This sum then is divided by one whole monochrome output white pixel, 255. The result again is specified in interim whole monochrome white pixels and a gray scale remainder of less than 255. The whole pixel integer and the grayscale remainder is processed to determine the final monochrome level of the supercell.

Operation—Whole Monochrome Pixels

Only at the supercell level is rounding up or down to the nearest whole monochrome white pixel allowed. The supercell's input gray level of 8968 divided by 255 equals 35 interim whole monochrome white pixels I plus a remainder of 43 R, as shown in FIG. 2E. If the remainder is less than ½ whole monochrome white pixel, or 127.5, rounding down occurs and the remainder is discarded. If the remainder is greater than 127.5, rounding up occurs and the remainder is discarded. In FIG. 2E, the remainder 43 is less than 127.5 and rounding down to 35 whole monochrome white pixels occurs F. This result is designated the Supercell Monochrome Final Level (FIG. 1).

Dropping to the next level of subcells, the larger subcells designated above, the previously derived Larger Subcell Monochrome Interim Levels and the Larger Subcell Remainders are retrieved. The upper left of the four subcells has an analog gray level of 3546 (FIG. 2C), which divided by 255 yields 13 interim whole monochrome white pixels I and a gray level remainder of 231 R, as shown in FIG. 2F. The upper right subcell has an analog gray level of 1555 (FIG. 2C), which divided by 255 yields 6 interim whole monochrome white pixels I and a gray level remainder of 25 R, as shown in FIG. 2F. The lower right subcell has an analog gray level of 1476 (FIG. 2C), which divided by 255 yields 5 interim whole monochrome white pixels I and a gray level remainder of 201 R, as shown in FIG. 2F. The lower left subcell has an analog gray level of 2391 (FIG. 2C), which divided by 255 yields 9 interim whole monochrome white pixels I and a gray level remainder of 96 R, as shown in FIG. 2F.

All of the interim gray level integers are summed yielding an interim gray level for the supercells' four larger subcells. The result is 13+6+5+9=33 interim whole monochrome white pixels. Within the Comparator function (FIG. 1), this result is subtracted from the previously derived Supercell Monochrome Final Level. If there is no difference, the Larger Subcell Monochrome Interim Levels become the Larger Subcell Monochrome Final Levels and the Larger Subcell Remainders are discarded. If there is a difference, the shortfall in whole pixels is distributed among the four larger subcells, one pixel per subcell until parity is reached.

Here the supercell final level is 35 (FIG. 2E) and the corresponding interim level for the four larger subcells is 33 (FIG. 2F), a difference of 2 whole monochrome white pixels. These 2 pixels now are distributed, one pixel per subcell, according to a sorting of the Larger Subcell Remainders. The subcells with the largest remainders, indicating the "whitest" subcells, receive the distributed whole pixels. In FIG. 2F, the upper left subcell has the largest remainder, 231, so its interim level of 13 is increased one pixel to 14 final monochrome whole white pixels F. Now the shortfall is just one pixel. The lower right subcell has the next largest remainder, 201, so its interim level of 5 is increased one pixel to 6 final whole monochrome white pixels F, also shown in FIG. 2F.

The Supercell Monochrome Final Level and the contained Larger Subcell Monochrome Final Levels now are at parity, so the remaining unaltered Larger Subcell Monochrome Interim Levels become the Larger Subcell Monochrome Levels (FIG. 1). The upper right larger subcell remains 6 F and the lower left larger subcell remains 9 F (FIG. 2F).

At this point each of the larger subcells becomes a nominal supercell. Each nominal supercell's monochrome final level is used to derive the contained subcells' monochrome final levels according to the method described above. The process continues until all of the image's 2×2 Subcell Monochrome Final Levels have been derived. FIG. 2G shows all 16 of the supercell's two-pixel-by-two-pixel subcells' derived final monochrome levels, Note that their sum equals 35 monochrome whole white pixels, at parity with the Supercell Monochrome Final Level as shown in FIG. 1.

The final monochrome patterns for each of the two-pixel-by-two-pixel subcell's final level now are set. The possible five levels of each two-pixel-by-two-pixel subcell may be represented by 16 different patterns. Any method may be used to Set Patterns (FIG. 1). The method used in FIG. 2H is the one taught by U.S. Pat. No. 6,002,493 by Case, "Method for Reproducing an Image", (1999).

Following the setting of the patterns for each subcell in the input image, all are reassembled into an Output Bitmap (FIG. 1) with the same dimensions and number of pixels as the Input Bitmap, but constructed of monochrome pixels 1-bit in depth.

Figure 3C:
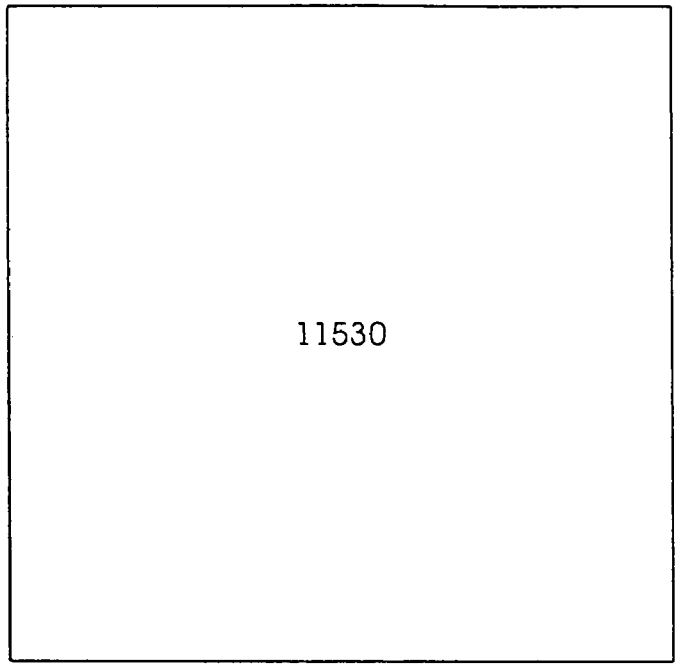
FIG. 3C shows the supercell, designating its overall gray level.
Figure 3D:
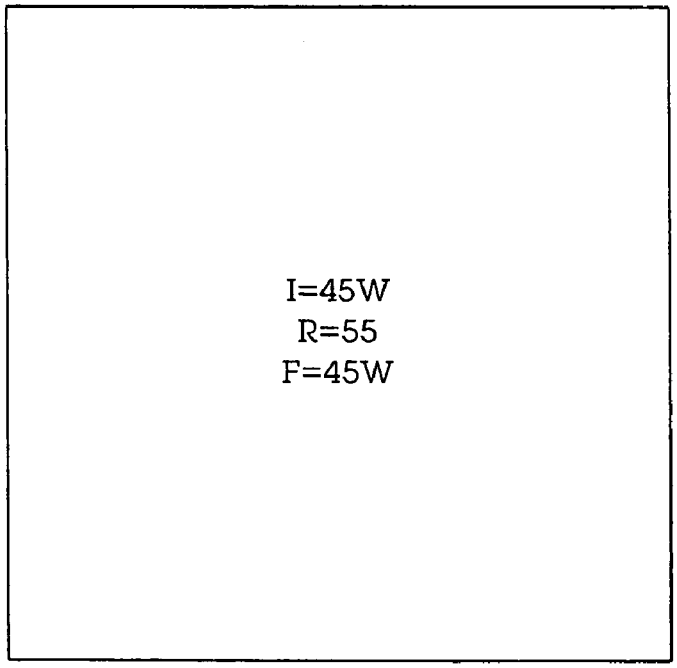
FIG. 3D shows the supercell, designating a final monochrome gray level.
Figures 3E, 3F:
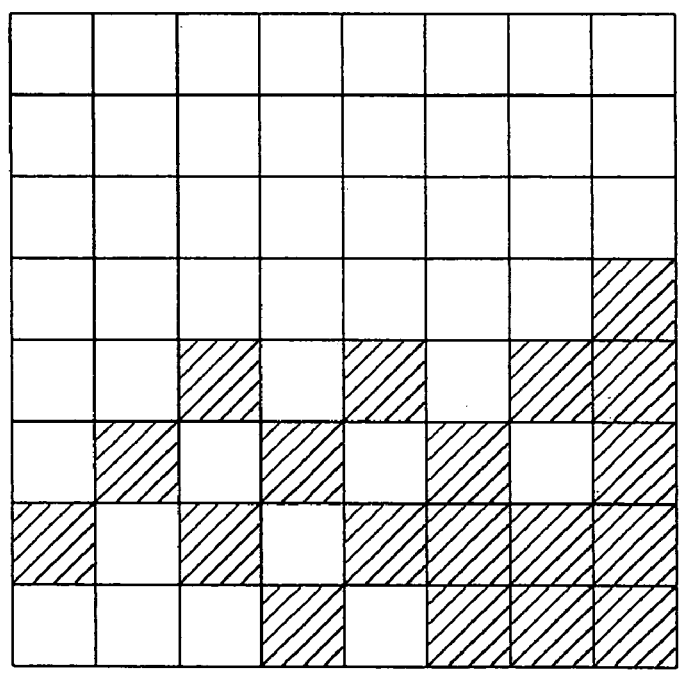
FIG. 3E shows the supercell, designating final monochrome gray levels for each of the contained two-pixel-by-two-pixel subcells.
FIG. 3F shows the supercell with the setting of monochrome two-pixel-by-two-pixel subcell patterns.

The additional embodiment depicted in FIGS. 3A-3F shows how the two-pixel-by-two-pixel input subcells immediately may be grouped into a supercell without using interim larger subcells. Note that the supercell may be as large as the entire global input image. The final monochrome level of the supercell shown in FIG. 3D is determined as above and distributed to the two-pixel-by-two-pixel output subcells through a sorting of all of the subcells' remainders as shown in FIG. 3E.

However, the more layers of interim larger subcells utilized, the more accurate each successive level becomes. When utilizing several levels of larger subcells, it is required that each level's larger subcells be of equal dimensions so that the monochrome gray level comparisons may be made accurately.

The alternative embodiment depicted in FIGS. 4A-4J shows how a number of larger subcells may be used. In FIG. 4A, the supercell is a rectangle. FIG. 4C shows 18 two-pixel-by-two-pixel subcells grouped into 6 two-pixel-by-six-pixel larger subcells that are rectangular and equal-sized. FIG. 4D shows these 6 larger subcells grouped into 2 six-pixel-by-six-pixel larger subcells that are square and equal-sized.

Figure 4F:
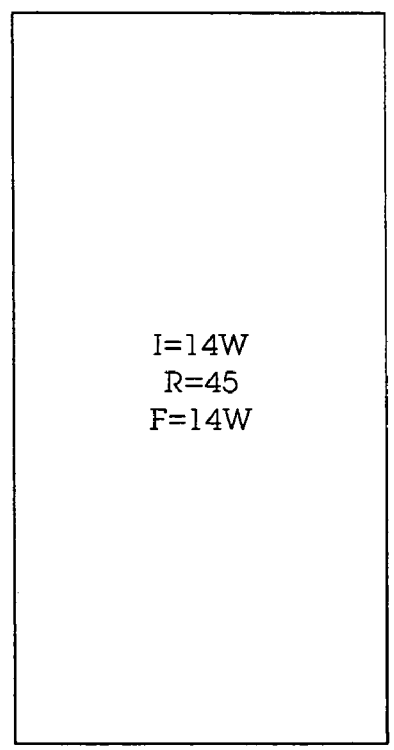
FIG. 4F shows the supercell, designating a final monochrome gray level.
Figures 4G, 4H:
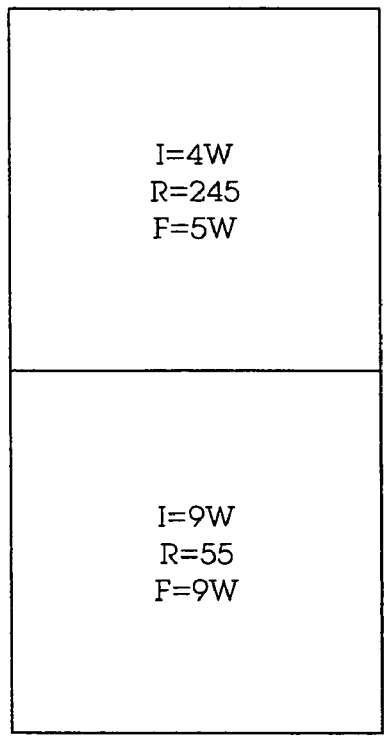
FIG. 4G and FIG. 4H show the supercell, designating final monochrome gray levels for each of the contained larger subcells.
Figures 4I, 4J:
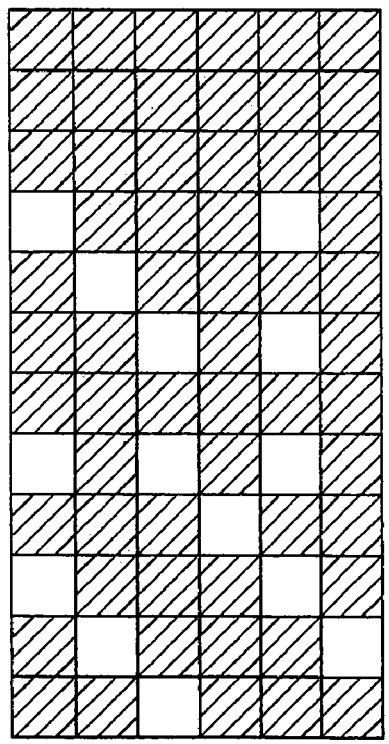
FIG. 4I shows the supercell, designating final monochrome gray levels for each of the contained two-pixel-by-two-pixel subcells.
FIG. 4J shows the supercell with the setting of monochrome two-pixel-by-two-pixel subcell patterns.

Final monochrome gray levels for the supercell are determined as above, as shown in FIG. 4F. Final monochrome gray levels for the subcells at each level again are determined by a sorting of their remainders as shown in FIGS. 4G, 4H and 4I, culminating in the derivation of the final monochrome levels for the two-pixel-by-two-pixel output subcells.

CONCLUSIONS, RAMIFICATIONS, AND SCOPE

Accordingly, the reader will see that the reverse diffusion method of this invention more accurately and efficiently determines the monochrome gray levels for any global input image's output local two-pixel-by-two-pixel halftone subcells. In addition, the monochrome gray levels of multi-pixel supercells of a size up to and including the entire global input image directly are linked to the monochrome gray levels of said subcells.

The method allows the global image's output monochrome gray level to be quantized to within ±½ monochrome pixel of its corresponding input analog gray level. The method also allows each local two-pixel-by-two-pixel output subcell to be quantized to within ±1 monochrome pixel of its corresponding subcell's input analog gray level.

Such accuracy is efficiently enabled on any computing device through the separation of the various subcells' interim whole monochrome pixel gray levels and gray level remainders, and the subsequent allocation of additional whole monochrome pixels, if necessary, using a sorting of said remainders.

Although the description above contains many specificities, those should not be construed as limiting the scope of the invention but as merely providing illustrations of some of the presently preferred embodiments of this invention.

Thus the scope of the invention should be determined by the appended claims and their legal equivalents, rather than by the examples given.

I claim:

1. A computer system comprising: one or more processors; a memory storing program instructions executble by the one or more processors to:
   receive an input bitmap that includes an array of multi-bit pixel values; and
   generate, from the input bitmap, an output bitmap that includes an array of single-bit pixel values, wherein said generating includes:
      computing gray level values for a first of two or more successive sets of cells in the input bitmap, wherein each cell of said first set of cells is a group of contiguous pixels of the input bitmap having the same dimensions;
      computing gray level values for remaining sets of said two or more sets of cells, wherein each cell in a given one of said remaining sets has the same dimensions, is larger than cells in a previous one of the two or more sets of cells, and includes two or more constituent cells from the previous set, wherein a last set of the two or more sets of cells has the largest cell size of all of the two or more sets of cells;
      computing a gray level error for each cell in the last set of cells; and
      for each cell in each of the remaining sets of cells, distributing any gray level error for that cell to at least one of the constituent cells of that cell.

2. The computer system of claim 1, wherein said computing the gray level values for the first set of cells includes computing a gray level value for each cell of the first set by adding the pixel values of pixels included in the cell.

3. The computer system of claim, 1 wherein said computing gray level values for the remaining sets of cells includes:
   for each cell of a given one of the remaining sets, computing the gray level value for that cell by adding the gray level values of the two or more constituent cells from the previous set.

4. The computer system of claim 1, wherein said computing the gray level error for each cell of the last set includes:
   rounding the gray level value of the cell to obtain a final gray level value;
   adding integer parts of the gray level values of the two or more constituent cells from the previous set to obtain a sum value; and subtracting the sum value from the final gray level value of the cell to determine the gray level error for the cell.

5. The computer system of xlaim 4, wherein the two or more sets of cells include at least three sets of cells, wherein said computing the gray level error for each cell of an intermediate one of said two or more sets includes:
adding integer parts fo the gray level values of the constituent cells of that cell to obtain a sum value; and
subtracting the sum value from a final gray level value of the cell to determine the gray level error for the cell.

6. The computer system of claim 1, wherein said distributing any gray level error includes distributing unit portions of the gray level error to said at least one of the constituent cells of said cell, wherein said at least one of the constituent cells are selected based on a sorting of fractional parts of the gray level values of the constituent cells of said cell.

7. The computer system of claim 1, wherein said generating also includes mapping the cells of the first set to binary cell patterns.

8. A computer-readable memory medium storing program instructions executable by a computer system to:
receive an input bitmap that includes an array of array of multi-bit pixel values; and
generate, from the input bitmap, an output bitmap that includes an array of single-bit pixel values, wherein said generating includes:
for each of a plurality of cells size starting with a smallest of the cell sizes, continuing for one or more successively larger cell sizes, and ending with a largest of the cell sizes:
(a) using that cell size of a plurality of cell sizes, partitioning the input bitmap into a plurality of non-overlapping cells having that cell size, wherein each cell is a group of contiguous pixels in the input bitmap; and
(b) computing a gray level value for each cell in the input bitmap having that cell size;
for each of the cell sizes beginning with the largest cell size and continuing for one or more successively smaller cell sizes up to but not including the smallest cell size:
(c) computing a gray level error value for each cell with that cell size; and
(d) distributing any gray level error value for each cell with that cell size to one or more of the subcells of the cell that have a next smaller cell size.

9. The memory medium of claim 8, wherein, for the smallest cell size, said computing the gray level value for each cell includes: adding the pixel values of the pixels included in that cell.

10. The memory medium of claim 8, wherein, for each of the cells sizes except for the smallest cell size, said computing the gray level value for each cell of that cell size includes: adding the gray level values of the subcells of that cell that have the next smaller cell size.

11. The memory medium of claim 8, wherein said computing the gray level error value for each cell of the largest cell size includes:
rounding the gray level value of the cell to obtain a final gray level value;
adding integer parts of the gray level values of the subcells cells of the cell that have the next smaller xell size; and
subtracting the sum value from the final gray level value of the cell to determine the gray level error value for the cell.

12. The memory medium of claim 11, wherein said plurality of cell sizes includes at least three cell sizes, wherein said computing the gray level error value for each cell of an intermediate one of said cell sizes, different from the largest and smallest cell sizes, includes:
adding integer parts of the gray level values of the subcells cells of the cell that have the next smaller cell size to obtain a sum value; and
subtracting the sum value from a final gray level value of the cell to determine the gray level error value for the cell.

13. The memory medium of claim 8, wherein said distributing any gray level error value of a given cell includes distributing one or more unit portions of the gray level error value to said one or more subcells of the cell, wherein said one of more subcells are seclected based of an ordering of fractional parts of the gray level values of the subcells of the cell.

14. The memory medium of claim 8, wherein said generating also includes mapping the cells of the smallest cell size to binary cell patterns.

15. A method comprising:
receiving an input image that includes an array of multi-bit pixel values; and
generating, from the input image, an output image that includes an array of dingle-bit pixel values, wherein said generating includes:
computing gray level values for cells of the input image at a plurality of levels of cell size, wherein each of the cells is a contiguous group of pixels in the input image, wherein each of the cells at any given one of the levels contains the same number of pixels;
for each of said cell size levels, except for the lowest cell size level: computing a gray level error for each cell in that level and distributing any computed error for that cell to one or more of the subcells of that cell that are at a next lower level of cell size.

16. The method of claim 8, wherein said computing the gray level values for cells of the input image includes:
computing a gray level value for each cell at the lowest cell size level by adding the pixel values of pixels included in that cell; and
for each of said cell size levels except for the lowest cell size level, computing a gray level value for each cell in those levels by adding the gray level values of the subcells of the cell.

17. The method of claim 15, wherein said computing the gray level error for each cell of a highest of the levels of cell size includes:
rounding the gray level value of the cell to obtain a final gray level value; and
adding integer parts of the gray level values of the subcells of the cell to obtain a sum value; and
subtracting the sum value from the final gray level value of the cell to determine the gray level error for the cell.

18. The method of claim 17, wherein said plurality of levels includes at least three levels, wherein said computing the gray level error for each cell of an intermediate one of said levels, different from the highest of lowest cell size level, includes:
adding integer parts of the gray level values of the subcells of the cell to obtain a sum value;
subtracting the sum value from a final gray level value of the cell to determine the gray level error for the cell.

19. The method of claim 15, wherein said distributing any computed error for a given cell includes distributing one or more unit portions of the computed error to the one or more subcells of the cell, wherein said one or more subcells are selected based on a sorting of fractional parts of the gray level values of the subcells of the cell.

20. The method of claim 15, wherein said generating also includes mapping the cells at the lowest level of cell size to binary cell patterns.

21. The method of claim 15 further comprising storing the output image in a memory.

22. The method of claim 15, wherein said cells at the lowest level are square cells.

23. A method comprising:
- receiving an input image that includes an array of multi-bit pixel values;
- operating on the input image in order to generate an output image that includes an array of single-bit pixels, wherein said operating includes:
- computing gray level values for cells of the input image at each of a plurality of levels of cell containment, wherein each cell of a given one of the levels includes contiguous groups of pixels of the same size, and wherein each cell at levels other than the level having the smallest cell size includes constituent cells from a level of next smaller cell size;
- for each of the levels other than the level having the smallest cell size and starting with the level having the largest cell size, diffusing gray level error of each cell in that level to the constituent cells in the level of next smaller cell size.

24. The method of claim 23, wherein said diffusing includes:
- distributing one or more portions of the gray level error of a first cell of a given level to one or more of the constituent cells in the level of next smaller cell size.

25. The method of claim 23, wherein said operating also includes:
- mapping the cells of the level of smallest cell size to binary cell patterns.

* * * * *

UNITED STATES PATENT AND TRADEMARK OFFICE
CERTIFICATE OF CORRECTION

| | |
|---|---|
| PATENT NO. | : 7,457,002 B2 |
| APPLICATION NO. | : 11/513848 |
| DATED | : November 25, 2008 |
| INVENTOR(S) | : Robert M. Case |

It is certified that error appears in the above-identified patent and that said Letters Patent is hereby corrected as shown below:

<u>Column 9,</u>

Lines 22-23, please delete "receive an input bitmap that includes an array of array of multi-bit pixel values" and substitute -- receive an input bitmap that includes an array of multi-bit pixel values --.

Lines 61-62, please delete "adding integer parts of the gray level values of the subcells cells of the cell that have the next smaller xell size" and substitute -- adding integer parts of the gray level values of the subcells cells of the cell that have the next smaller cell size --.

<u>Column 10,</u>

Lines 22-23, please delete "from the input image, an output image that includes an array of dingle-bit pixel values" and substitute -- from the input image, an output image that includes an array of single-bit pixel values --.

Signed and Sealed this

First Day of September, 2009

David J. Kappos
*Director of the United States Patent and Trademark Office*